United States Patent
McClard et al.

(10) Patent No.: US 9,186,903 B2
(45) Date of Patent: Nov. 17, 2015

(54) METHOD OF MANUFACTURING AN ARTICLE OF APPAREL WITH A COATED GRAPHIC

(71) Applicant: NIKE, Inc., Beaverton, OR (US)

(72) Inventors: Steven McClard, Portland, OR (US); Eric W. Halverson, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 354 days.

(21) Appl. No.: 13/902,655

(22) Filed: May 24, 2013

(65) Prior Publication Data

US 2014/0150968 A1 Jun. 5, 2014

Related U.S. Application Data

(62) Division of application No. 12/365,064, filed on Feb. 3, 2009, now Pat. No. 8,464,363.

(51) Int. Cl.
| | |
|---|---|
| *B41J 2/325* | (2006.01) |
| *B44C 1/17* | (2006.01) |
| *A41D 19/00* | (2006.01) |
| *A41D 19/015* | (2006.01) |
| *B32B 38/00* | (2006.01) |
| *A63B 71/14* | (2006.01) |

(52) U.S. Cl.
CPC .............. *B41J 2/325* (2013.01); *B44C 1/1712* (2013.01); *A41D 19/0051* (2013.01); *A41D 19/01558* (2013.01); *A63B 71/148* (2013.01); *B32B 38/145* (2013.01); *Y10T 156/10* (2015.01); *Y10T 156/108* (2015.01); *Y10T 428/24612* (2015.01); *Y10T 428/24868* (2015.01)

(58) Field of Classification Search
CPC .............................. B41J 2/325; B44C 1/1712
USPC ................... 101/487, 488; 156/230
See application file for complete search history.

(56) References Cited

U.S. PATENT DOCUMENTS

| | | | | |
|---|---|---|---|---|
| 3,920,870 | A | * | 11/1975 | Ackerman et al. ............... 428/46 |
| 3,985,602 | A | * | 10/1976 | Stuart ............................ 156/235 |
| 5,010,672 | A | | 4/1991 | Coleman |
| 5,246,518 | A | * | 9/1993 | Hale ............................... 156/230 |
| 5,248,363 | A | * | 9/1993 | Hale ............................... 156/230 |
| 5,281,499 | A | | 1/1994 | Bussard |
| 5,364,688 | A | * | 11/1994 | Mahn, Jr. ....................... 428/187 |
| 5,397,521 | A | * | 3/1995 | Quinn ........................... 264/129 |
| 5,436,073 | A | * | 7/1995 | Williams et al. ............... 428/343 |
| 5,487,614 | A | * | 1/1996 | Hale ......................... 400/120.02 |
| 5,488,907 | A | * | 2/1996 | Xu et al. ........................ 101/488 |
| 5,573,834 | A | * | 11/1996 | Stahl .......................... 428/195.1 |
| 5,575,877 | A | * | 11/1996 | Hale et al. ...................... 156/240 |
| 5,598,582 | A | | 2/1997 | Andrews et al. |
| 5,636,385 | A | | 6/1997 | Harrison |
| 5,640,180 | A | * | 6/1997 | Hale et al. .......................... 347/3 |
| 5,673,437 | A | | 10/1997 | Chase et al. |

(Continued)

FOREIGN PATENT DOCUMENTS

WO 2004050343 6/2004

*Primary Examiner* — Khoa Huynh
*Assistant Examiner* — Khaled Annis
(74) *Attorney, Agent, or Firm* — Shook, Hardy & Bacon L.L.P.

(57) ABSTRACT

A method of applying a graphic to an article is disclosed. The method includes applying a graphic to a backer material and covering the backer material with a clear protective layer, which may be silicone, to help prevent degradation of the graphic with time and use.

20 Claims, 11 Drawing Sheets

(56) References Cited

U.S. PATENT DOCUMENTS

| | | |
|---|---|---|
| 5,811,371 A * | 9/1998 | Egashira et al. ............. 503/227 |
| 5,902,111 A * | 5/1999 | Lindsey .......................... 434/81 |
| 5,933,867 A | 8/1999 | Corder |
| 5,948,586 A * | 9/1999 | Hare ............................ 430/138 |
| 5,991,926 A | 11/1999 | Lakusiewicz |
| 6,216,276 B1 | 4/2001 | Eibert |
| 6,245,710 B1 * | 6/2001 | Hare et al. .................... 503/201 |
| 6,339,845 B1 | 1/2002 | Burns et al. |
| 6,408,442 B1 | 6/2002 | Kang |
| 6,423,466 B2 * | 7/2002 | Hare et al. .................... 430/263 |
| 6,613,412 B1 * | 9/2003 | Dressler ....................... 428/41.8 |
| 6,618,860 B1 | 9/2003 | Sullivan et al. |
| 6,625,815 B2 | 9/2003 | Litke |
| 6,654,964 B1 | 12/2003 | Staihar et al. |
| 6,704,939 B2 | 3/2004 | Faulconer |
| 6,729,058 B2 | 5/2004 | Ferguson |
| 6,811,840 B1 * | 11/2004 | Cross ......................... 428/32.62 |
| 6,928,658 B2 | 8/2005 | Taira et al. |
| 7,000,257 B2 | 2/2006 | Bevier |
| 7,254,840 B2 | 8/2007 | Hammons et al. |
| 7,495,162 B1 * | 2/2009 | Pokallus ....................... 84/422.4 |
| 2001/0025687 A1 * | 10/2001 | Cross ............................ 156/240 |
| 2002/0029714 A1 * | 3/2002 | Hale et al. ..................... 101/484 |
| 2002/0109764 A1 * | 8/2002 | Hale et al. ..................... 347/100 |
| 2003/0054923 A1 | 3/2003 | Brassil et al. |
| 2003/0188373 A1 | 10/2003 | Garneau |
| 2004/0137356 A1 * | 7/2004 | Tomita et al. ................. 430/124 |
| 2004/0237165 A1 | 12/2004 | Holden |
| 2006/0027292 A1 | 2/2006 | Persic |
| 2007/0020468 A1 * | 1/2007 | Ekeland et al. ............... 428/451 |
| 2007/0031615 A1 * | 2/2007 | Nair et al. .................. 428/32.38 |
| 2007/0039682 A1 * | 2/2007 | Drake et al. .................. 156/230 |
| 2007/0148409 A1 | 6/2007 | Rios et al. |
| 2008/0295211 A1 | 12/2008 | Lo |
| 2009/0022911 A1 * | 1/2009 | Suzuki et al. ................ 428/32.6 |
| 2009/0035461 A1 * | 2/2009 | Grier et al. ................. 427/248.1 |
| 2011/0289647 A1 * | 12/2011 | Chiao et al. ......................... 2/69 |
| 2012/0166146 A1 * | 6/2012 | Cincotti ............................ 703/1 |

* cited by examiner

METHOD OF MANUFACTURING AN ARTICLE OF APPAREL WITH A COATED GRAPHIC

CROSS-REFERENCE TO RELATED APPLICATION

This application is a divisional application of co-pending application Ser. No. 12/365,064 filed Feb. 3, 2009, the disclosure of which is hereby incorporated by reference.

BACKGROUND

Methods of applying graphics to the palm of a glove have been previously proposed. For example, some manufacturers use multi-colored silicone coatings to achieve color in the palm of a glove. As the coatings of colored silicone are applied, a silk screening process is used to apply one or more graphics to portions of the palm. However, as pigments are added to the silicone, the molecular structure of the silicone can degrade, which can lead to less tensile strength and tack. Over time the coating may weaken and become less durable. The result can be a degraded graphical image over time. There is a need in the art for a design that overcomes these shortcomings.

SUMMARY

The invention provides a method of applying a graphic to an article of apparel, the method comprising steps of receiving, applying, covering, and forming. In one step, the method includes receiving a graphic associated with the article of apparel. In another step, the method includes applying the graphic directly on a backer material. In another step, the method includes covering the backer material and the graphic with a protective layer. In another step, the method includes forming a portion of the article of apparel from the backer material, the graphic, and the protective layer, the entire portion of the article of apparel conforming to a portion of a wearer.

In another aspect, the invention provides a method of applying a graphic to an article of apparel, the method comprising steps of receiving, printing, covering, and forming. In one step, the method includes receiving a graphic associated with the article of apparel. In another step, the method includes printing the graphic directly on the backer material using a dye sublimation printer. In another step, the method includes covering the backer material and the graphic with a transparent silicone layer. In another step, the method includes forming a portion of the article of apparel from the backer material, the graphic, and the silicone layer, the portion of the article of apparel having (a) a first surface facing away from a wearer and an opposite second surface and (b) a first portion disposed on a first side and a second portion disposed on an opposite second side, and the graphic extending from the first surface through the first portion.

In another aspect, the invention provides a method of applying a graphic to a glove, the method comprising steps of receiving, printing, covering, forming, and combining. In one step, the method includes receiving a graphic associated with the glove. In another step, the method includes printing the graphic directly on a backer material. In another step, the method includes covering the backer material and the graphic with a protective layer. In another step, the method includes forming a first material element from the backer material, the graphic, and the protective layer. In another step, the method includes combining the first material element with one or more additional material elements to form the glove.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

BRIEF DESCRIPTION OF THE DRAWINGS

The foregoing Summary and the following Detailed Description will be better understood when read in conjunction with the accompanying figures.

DETAILED DESCRIPTION

Embodiments of the present invention include customizable articles and a process for applying a graphic to a customizable article. In the exemplary embodiment discussed this detailed description, the article is a glove. In particular, the exemplary embodiment is illustrated as a football glove that may be associated with various football skill positions such as wide receiver. In other embodiments, other types of football gloves could be used. Although the glove of the exemplary embodiment is discussed and depicted as having the configuration of a football glove, concepts associated with the glove may be applied to various types of athletic gloves. In addition to a football glove, therefore, concepts discussed herein may be applied to soccer goalkeeper gloves, hockey gloves, ski gloves, and weightlifting gloves, for example. In addition, concepts discussed herein may be applied to various types of gloves used for generally non-athletic purposes (e.g., work gloves, welding gloves, oven mitts).

In addition, it should be understood that the principles taught throughout this detailed description may be applied to additional articles as well. Generally, these principles could be applied to any article that may be worn. In some embodiments, the article may include one or more articulated portions that are configured to move. In other cases, the article may be configured to conform to portions of a wearer in a three-dimensional manner. Examples of articles that are configured to be worn include, but are not limited to: footwear, gloves, shirts, pants, socks, scarves, hats, jackets, as well as other articles. Other examples of articles include, but are not limited to: shin guards, knee pads, elbow pads, shoulder pads, as well as any other type of protective equipment.

Additionally, in some embodiments, the article could be another type of article that is not configured to be worn, including, but not limited to: bags, purses, luggage, backpacks, as well as other articles that may not be worn. In some embodiments, the customizable article could be a type of sports equipment including, but not limited to soccer balls, basketballs, footballs and other types of objects.

Figure 1:
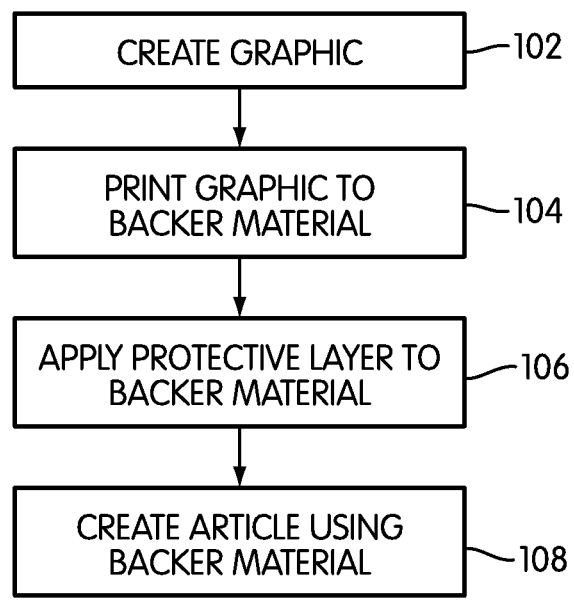
FIG. 1 is an exemplary embodiment of a process for applying a graphic to an article.

FIG. 1 is an exemplary embodiment of process for applying a graphic to a customizable article. Referring to FIG. 1, the process may include one or more steps. During a first step 102, a graphic may be created. The term "graphic" as used throughout this detailed description and in the claims, applies to any image, picture, text or indicia. In some cases, a graphic may be used for decorative purposes. In other cases, a graphic may be used for displaying various types of information. In still other cases, a graphic may include the application of a color to a portion or a substantial entirety of an article. In some cases, a single solid color could be applied to a portion or a substantial entirety of an article. In other cases, multiple colors could be applied in various manners to a portion or a substantial entirety of an article. Furthermore, in still other cases, a graphic could include a combination of images, colors and other types of designs.

Generally, a graphic may be configured with any size and shape, including, but not limited to: square shapes, rectangular shapes, elliptical shapes, triangular shapes, regular shapes, irregular shapes as well as other types of shapes. In some cases, a graphic may be three dimensional. In other cases, a graphic may be substantially two dimensional.

In different embodiments, a graphic can be created by various parties. In some cases, the graphic could be created by one or more persons associated with a manufacturer. In other cases, the graphic could be created by a customer. In still other cases, the graphic could be created by a third party.

Following a first step 102 of creating a graphic, the graphic can be printed to a backer material during a second step 104. The term "backer material" as used throughout this detailed description and in the claims refers to a material that may be associated with a portion of an article, which is configured to receive a graphic. For example, in this exemplary embodiment, a backer material could be any material that may be used in the palm of a glove. In some cases, a backer material can be associated with other layers of an article. In an exemplary embodiment, the backer material can be associated with an outer layer of the palm of a glove, so that the graphic can be visible along the palm.

Next, during a third step 106, a protective layer may be applied to the backer material. In particular, the protective layer can be applied over a side of the backer material that includes a graphic. Finally, during a fourth step 108, an article may be created using the backer material. In some cases, the backer material can be associated with additional portions of an article. For example, in this exemplary embodiment, the backer material can be sewn to the palm of a partially assembled glove.

In some embodiments, a method of applying a graphic to an article can include provisions for customizing the graphic. In some cases, a customer may have access to a customization system for selecting, creating and arranging one or more graphics on a portion of an article. Examples of one type of customization system that can be used with the present embodiments are disclosed in U.S. Ser. No. 11/612,320, filed on Dec. 18, 2006, and hereby incorporated by reference.

Figure 2:
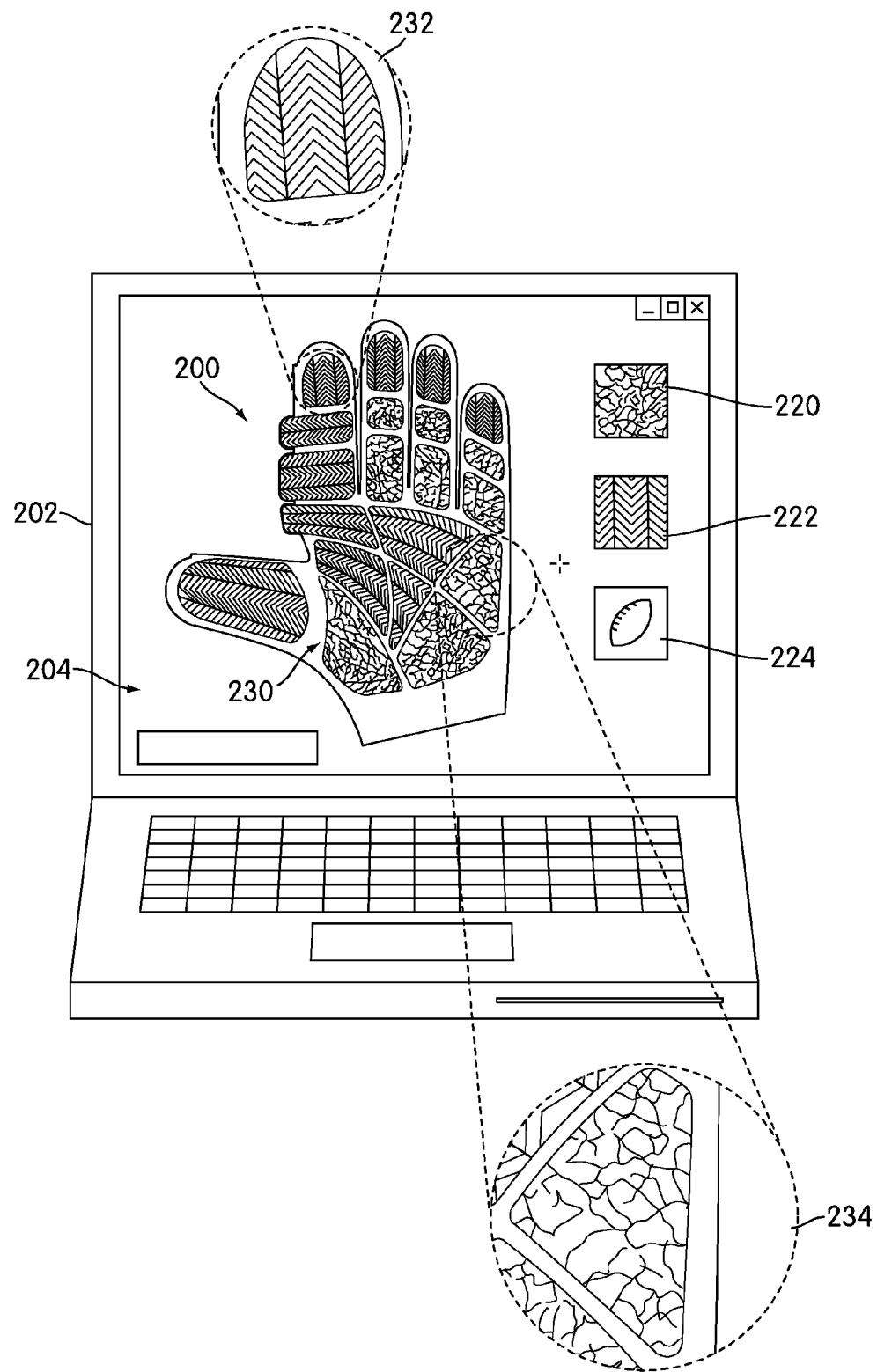
FIG. 2 is a schematic view of an exemplary embodiment of customization system for creating a customized graphic.
Figure 3:
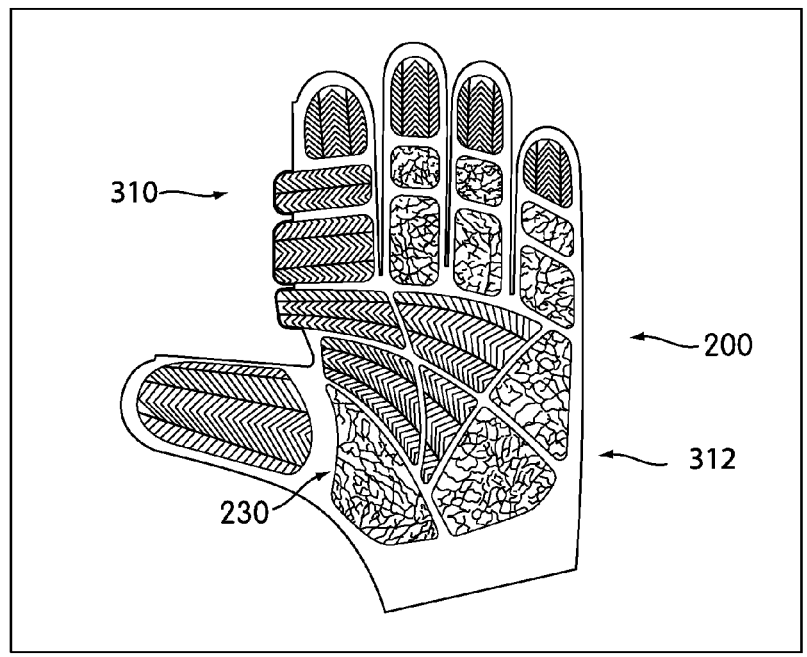
FIG. 3 is a schematic view of an exemplary embodiment of an article with a set of customized graphics.

FIGS. 2 and 3 illustrate embodiments of a customization system for an article. Referring to FIG. 2, computer 202 is configured to provide access to graphical interface system 204. In some embodiments, graphical interface system 204 may be a graphical editor of some kind. In an exemplary embodiment, graphical interface system 204 may provide a set of tools that allow the customer to easily apply a custom design to an article.

In some embodiments, graphical interface system 204 includes article representation 200. The term "article representation" as used throughout this detailed description and in the claims refers to a virtual representation of an article within graphical interface system 204. As previously discussed, article representation 200 can be a representation of a football glove. In this embodiment, a user may apply one or more customized graphics to various portions of article representation 200.

In different embodiment, the tools available to a user for applying customized graphics can vary. In some embodiments, graphical interface system 204 can include a set of pre-selected graphics. For example, in this embodiment, graphical interface system 204 includes first pre-selected graphic 220, second pre-selected graphic 222 and third pre-selected graphic 224, which are associated with a splatter-type graphic, a tread-type graphic and a football icon graphic, respectively. It will be understood that other embodiments could include any number of additional pre-selected graphics. Furthermore, in still other embodiments, a user may be able to create a customized graphic using standard graphics editing tools. In still further embodiments, a user may have access to other databases of graphics, including, but not limited to, digital photo-albums, online graphic databases, or other collections of graphics that can be accessed via the internet or digital memory devices associated with computer 202.

In some embodiments, article representation 200 can be associated with one or more pre-selected graphic regions 230. In one embodiment, pre-selected graphic regions 230 may be associated with one or more features of a palm portion of a football glove. In some cases, a user can choose to apply a particular pre-selected graphic to one or more of the pre-selected graphic regions 230. For example, in the exemplary embodiment illustrated in FIG. 2, second pre-selected graphic 222 has been applied to first pre-selected graphic region 232. Also, first pre-selected graphic 220 has been applied to second pre-selected graphic region 234.

Referring to FIG. 3, a finalized design for article representation 200 can include a variety of different pre-selected graphics applied over each of the pre-selected graphic regions 230. In some cases, pre-selected graphic regions 230 can be disposed on various portions of an article. In this exemplary embodiment, pre-selected graphics regions 230 can be disposed on phalangeal regions 310 and metacarpal region 312 associated with the bones of the fingers and bones of the palm, respectively. In some cases, the spacing between adjacent pre-selected graphic regions 230 may be associated with joints of phalangeal regions 310. In a similar manner, pre-selected graphic regions 230 disposed on metacarpal region 312 may be associated with natural creases of the palm. Although the current embodiment includes pre-selected graphic regions 230 that are disposed over a substantial majority of phalangeal regions 310 and metacarpal region 312, other embodiments can include any arrangement of pre-selected graphic regions 230.

In some embodiments, pre-selected graphic regions 230 may be associated with one or more pads of a glove. In other words, pre-selected graphic regions 230 may be raised portions of a glove. In other embodiments, however, pre-selected graphic regions 230 could be substantially flattened with respect to an outer surface of the glove.

Generally, a graphic may be applied to any type of substrate using a pigment arrangement of some kind. In some cases, a graphic can be transferred to a backer material using a stamp. In other cases, a graphic can be applied as a sticker to the backer material. In still other embodiments, the graphic can be transferred using traditional inks, paints, or other materials for applying graphics. In one exemplary embodiment, a graphic can applied using a dye sublimation technique. In particular, a graphic can be applied using a dye sublimation printer.

Figure 4:
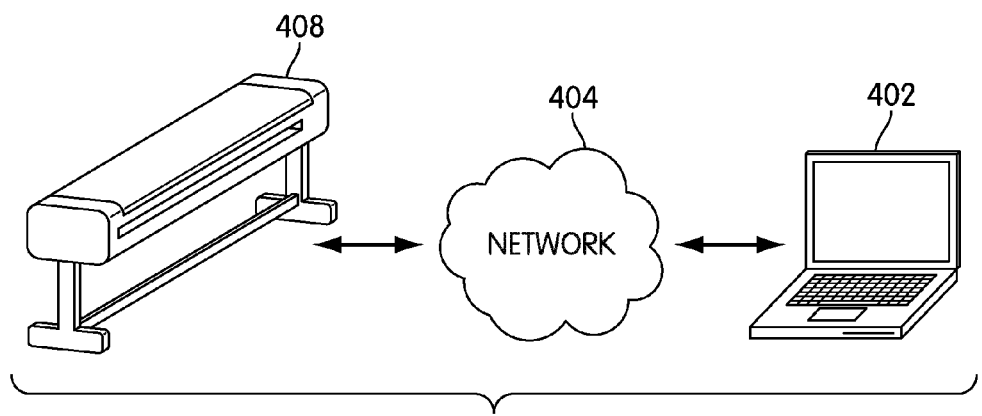
FIG. 4 is a schematic view of an exemplary embodiment of a system for sending information related to a customized graphic to a printer.

FIG. 4 is a schematic diagram of a preferred embodiment of a network and connected computer hardware. Referring to FIG. 4, printer 408 may be connected to computer 402 via network 404. In this exemplary embodiment, printer 408 is a dye sublimation printer. With this arrangement, an individual may use computer 402 to transmit information related to a graphic to printer 408 via network 404. In different embodiments, computer 402 may be any type of computer, including either a desktop or a laptop computer. In other embodiments, computer 402 may be any type of device that includes a display, a processor, and the ability to transmit and receive data from a remote network. Examples of such devices include, but are not limited to, PDA's, cell phones, as well as other types of devices.

Generally, network 404 may be a system allowing for the exchange of information between computer 402 and printer 408. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 404 may be a packet-switched communications system. In a preferred embodiment, network 404 may be the Internet. In other embodiments, network 404 connecting printer 408 and computer 402 may be removed entirely and the computer hardware connected in a different manner. For example, in another embodiment, printer 408 and computer 402 may be connected by a line, such as a cable. Printer 408, computer 402, and network 404 may be located in a factory, retail store, or other establishment. Additionally, network 404 may be connected to the Internet. For example, if connected to the Internet, customers requiring customizable articles may transmit digital files to computer 402 from any portion of the world.

Figure 5:
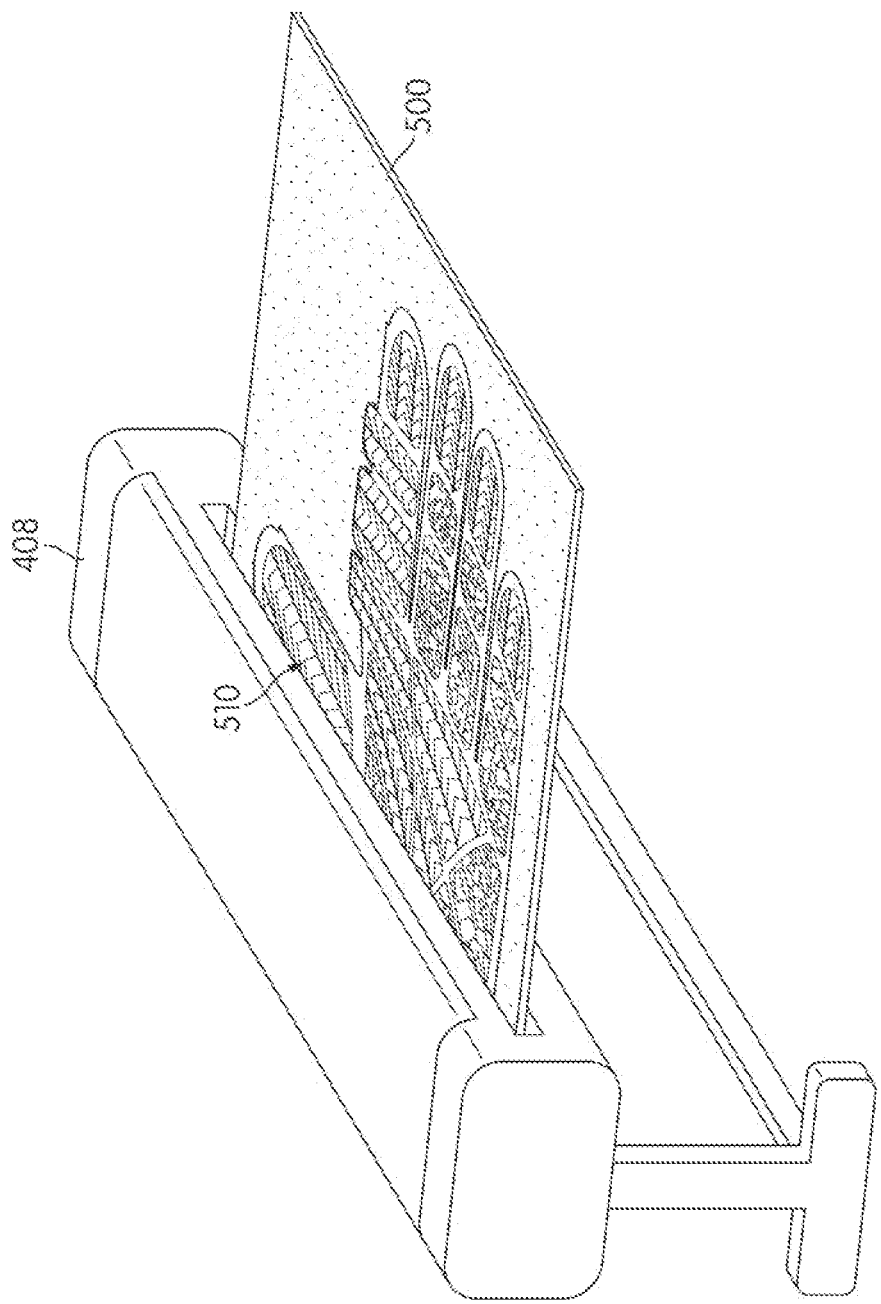
FIG. 5 is a schematic view of an exemplary embodiment of a set of customized graphics being applied to a backer material.

FIG. 5 illustrates an embodiment of a set of customized graphics being applied to a backer material. Referring to FIG. 5, backer material 500 is inserted into printer 408. In this exemplary embodiment, customized graphic set 510 is applied to a surface of backer material 500. In particular, customized graphic set 510 may be applied in a pre-determined arrangement that may be shaped like the palm of a hand.

In this exemplary embodiment, backer material 500 is depicted as having a substantially conventional configuration incorporating a plurality material elements (e.g., textile, polymer sheets, polymer foam, leather, or synthetic leather) that are stitched or adhesively bonded together to form a structure that extends around and contacts the hand. The material elements may be selected and located in order to impart properties of durability, air-permeability, wear-resistance, flexibility, and comfort, for example. In some cases, backer material 500 can be configured as a rectangular sheet of material from which any shaped portion for an article can be cut. In other embodiments, however, backer material 500 can be pre-cut into a desired shape before insertion into a printer.

In the current embodiment, customized graphics are applied directly to the backer material by way of a dye sublimation printer. In some other embodiments, one or more customized graphics can be printed to a film before being applied to a backer material. Following this, the graphic can be transferred from the film to the backer material using a separate heating press. In other words, any type of dye sublimation process can be used for transferring a graphic to a backer material.

A method of applying a graphic to an article can include provisions for protecting the graphic from degradation. As previously discussed, in some cases a protective layer can be applied to the backer material.

Figure 6:
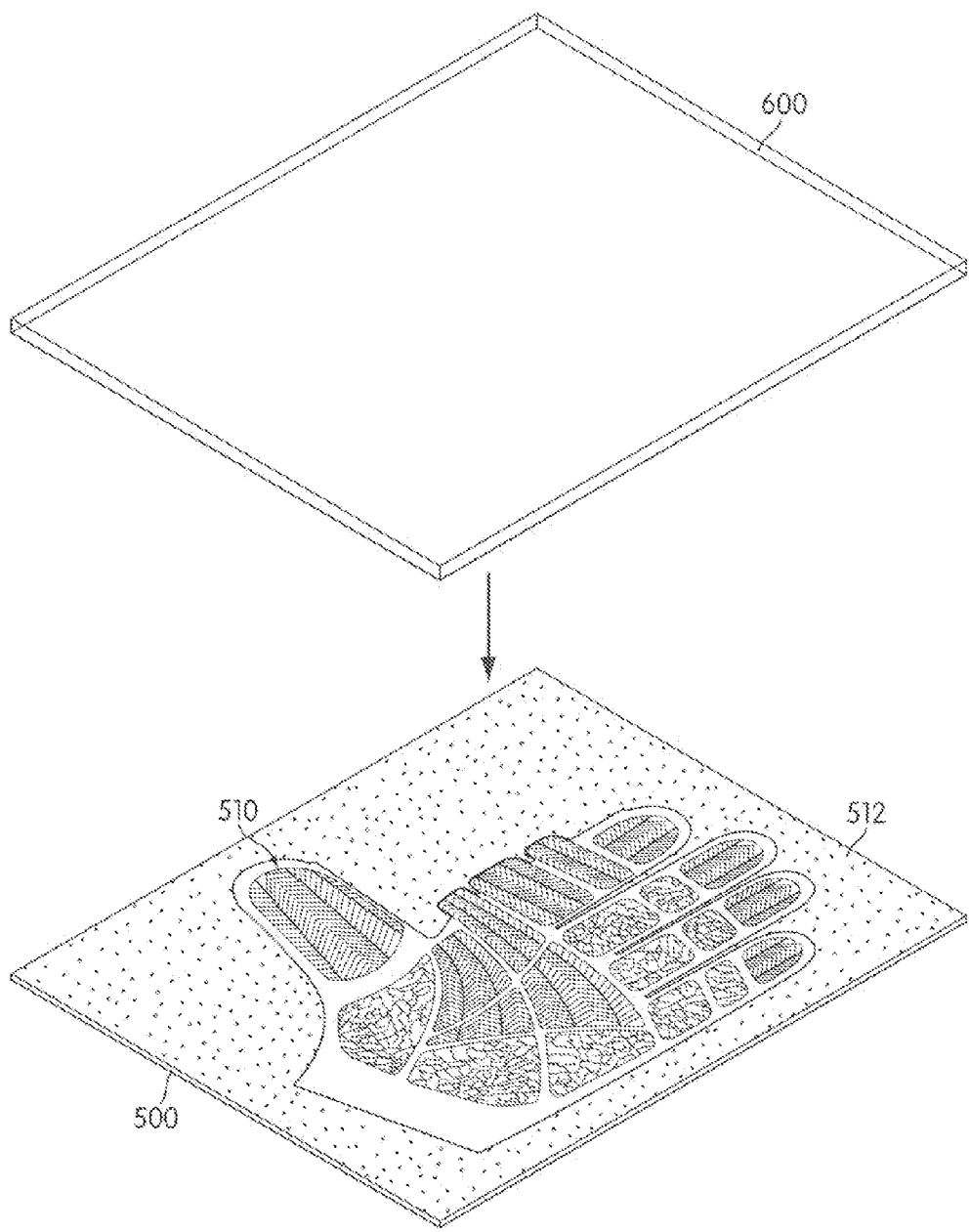
FIG. 6 is an exploded isometric view of an exemplary embodiment of a protective layer being applied to a backer material.
Figure 7:
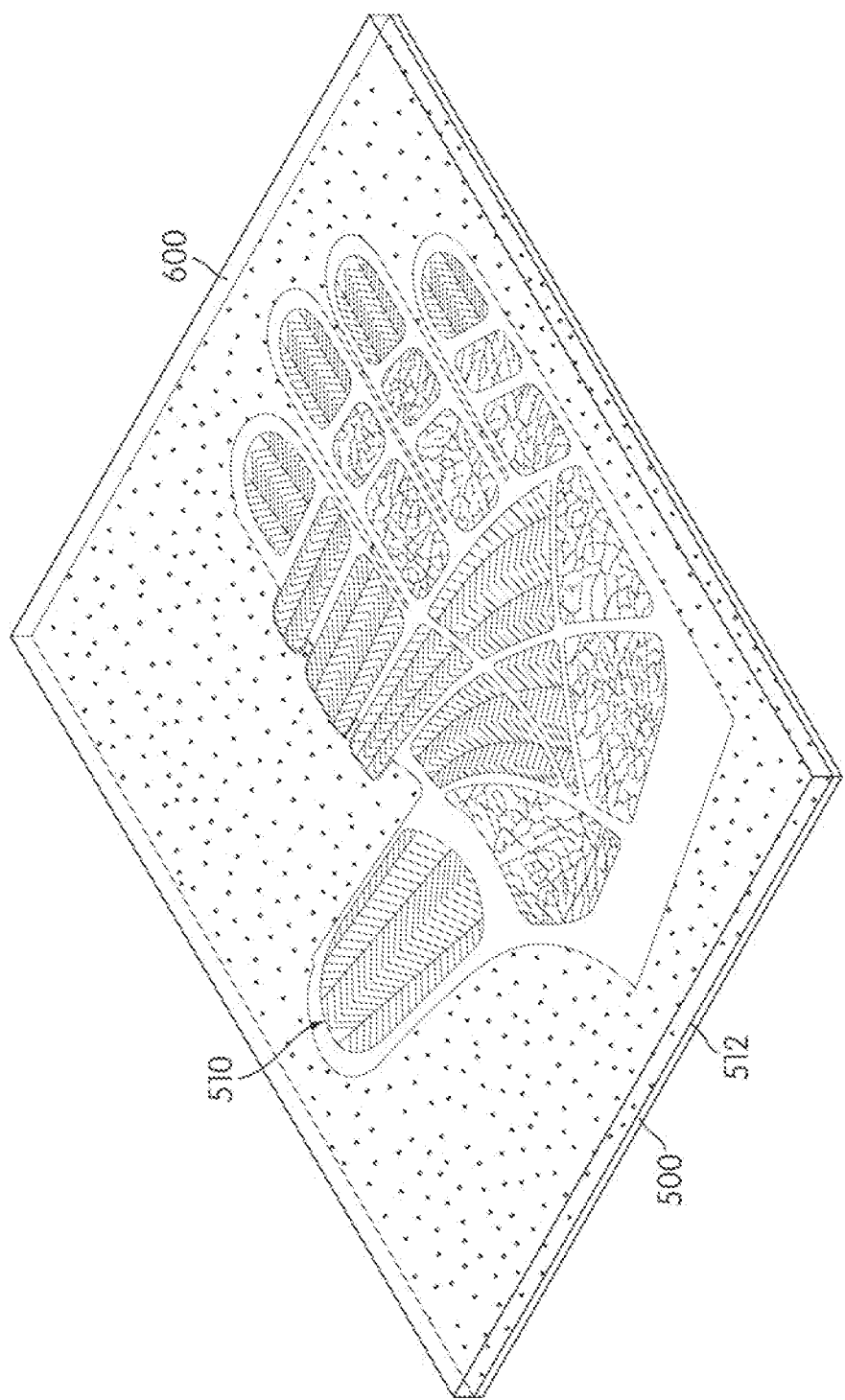
FIG. 7 is an isometric view of an exemplary embodiment of a protective layer applied to a backer material.

FIGS. 6 and 7 illustrate embodiments of a protective layer being applied to a backer material. Referring to FIGS. 6 and 7, protective layer 600 may be associated with first surface 512 of backer material 500, which is a surface including customized graphic set 510. In some cases, protective layer 600 can be a pre-formed layer that is applied to backer material 500 using heat and/or pressure. In other cases, some type of adhesive may be used to apply protective layer 600 to backer material 500. In still other cases, protective layer 600 can be applied as a liquid spray that forms a solid layer when dried. In still other embodiments, protective layer 600 can be deposited onto backer material 500 in any other manner.

Referring to FIG. 7, protective layer 600 has been applied to backer material 500. In different embodiments, the properties of protective layer 600 can vary. In some cases, protective layer 600 can be a substantially transparent layer. In other cases, protective layer 600 can be a substantially translucent layer. In an exemplary embodiment, protective layer 600 can be a substantially clear material. In this exemplary embodiment, for example, customized graphic set 510 may be visible through protective layer 600.

A protective layer can be made of any type of material. Examples of different materials that can be used include, but are not limited to, polymers, rubbers, silicone based materials, as well as other types of materials. In an exemplary embodiment, the protective layer may be a made of a material including silicone. Furthermore, the silicone may have a substantially transparent property to allow a graphic to be fully visible through the protective layer. In comparison with bare natural latex foam materials, using a material comprising silicone may provide a higher coefficient of friction for an exterior surface of a glove made using backer material 500.

Figure 8:
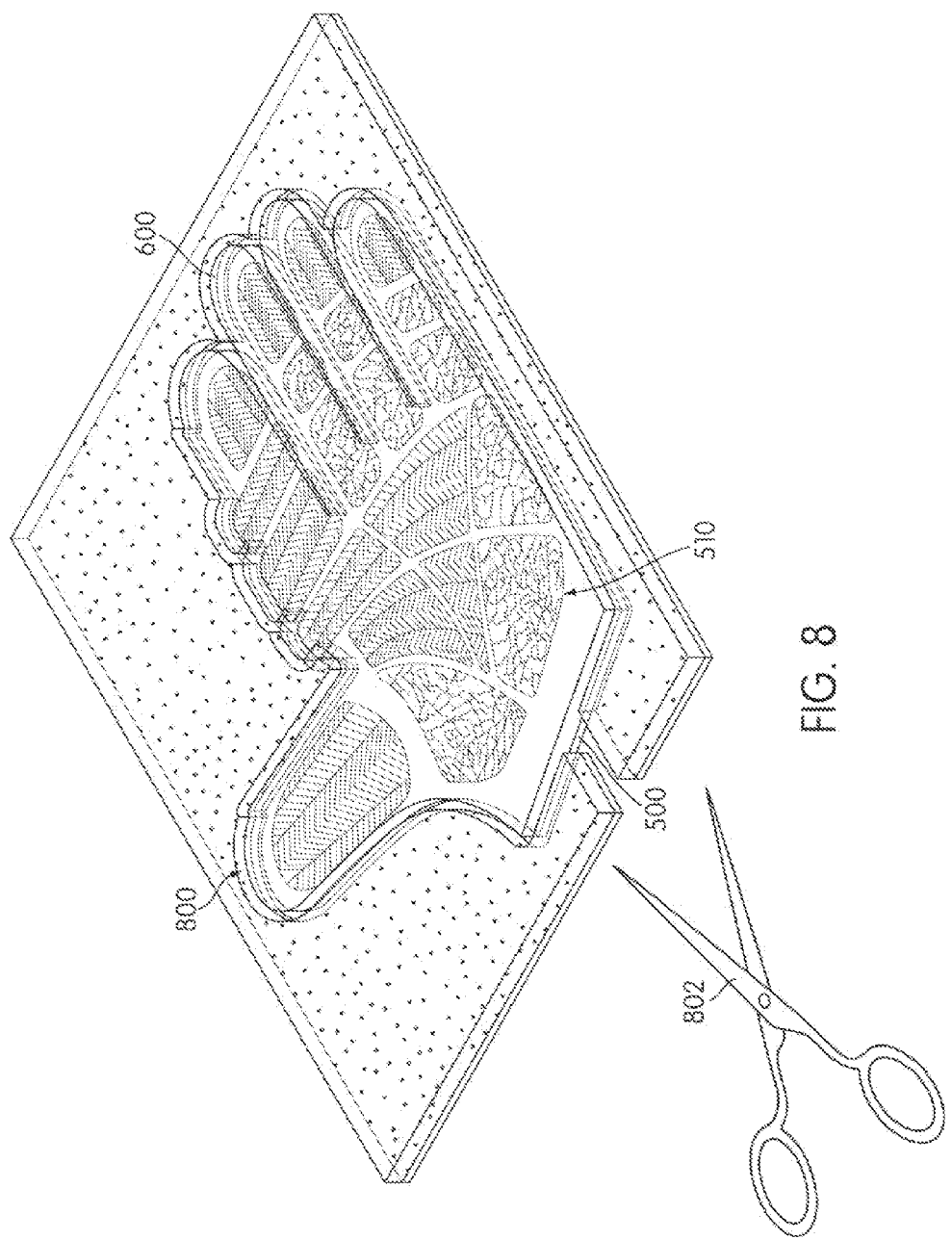
FIG. 8 is a schematic view of an exemplary embodiment of a portion being cut from a backer material.
Figure 9:
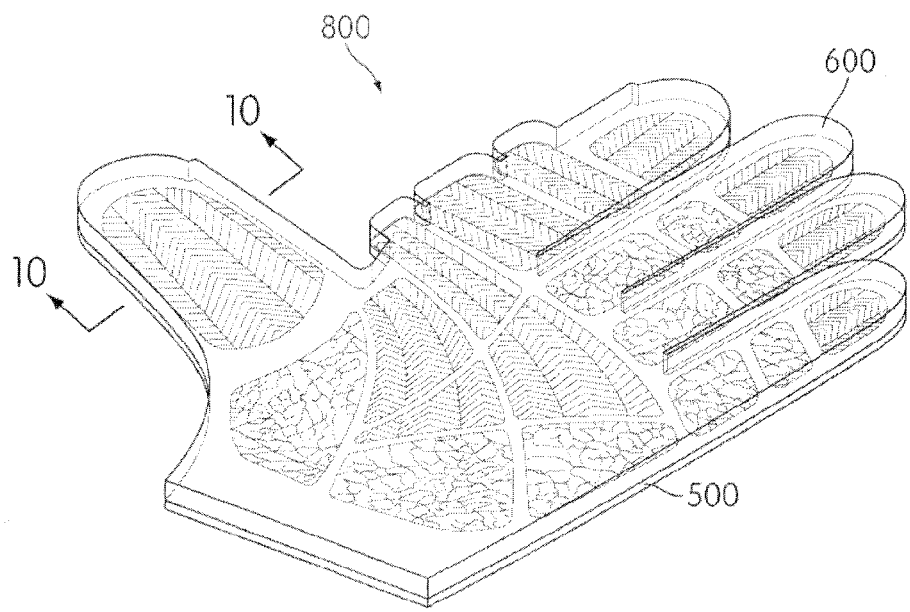
FIG. 9 is an isometric view of an exemplary embodiment of a portion of an article including a backer material, a graphic and a protective layer.

Referring to FIGS. 8 and 9, once a protective layer has been applied to a backer material with a graphic, a portion may be cut from the backer material. Referring to FIG. 8, palm portion 800 may be cut from a substantially square portion of backer material 500. In different embodiments, palm portion 800 can be cut using any known method in the art. For purposes of illustration, the cutting of palm portion 800 is indicated using scissors 802. Examples of other cutting devices include, but are not limited to, razors, stamp cutting devices, laser cutting devices as well as other cutting devices.

Figure 10:
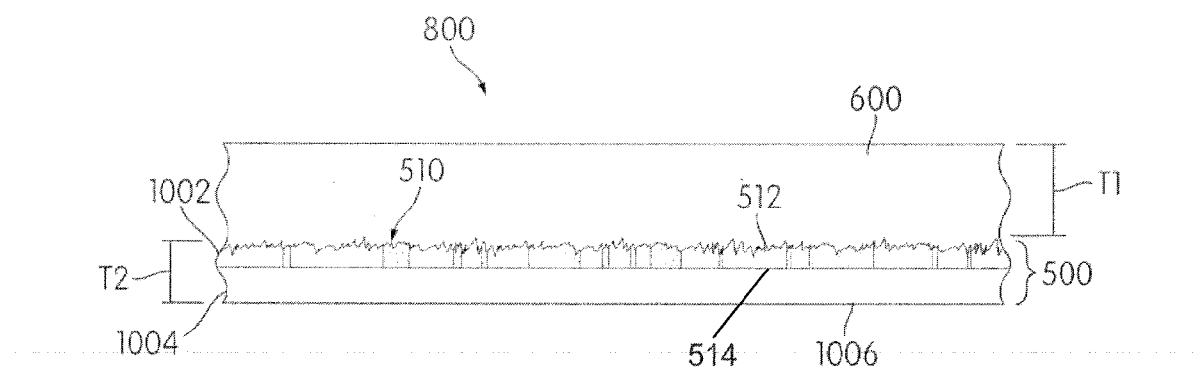
FIG. 10 is a cross sectional view of an exemplary embodiment of a portion of an article including a backer material, a graphic and a protective layer.

FIG. 10 illustrates a cross sectional view of palm portion 800. In this exemplary embodiment, palm portion 800 may include backer material 500. Furthermore, customized graphic set 510 is disposed on backer material 500. In addition to first surface 512 which may be associated with protective layer 600, backer material 500 may have a second surface 1006 and an inner boundary 514 located between first surface 512 and second surface 1006. Backer material 500 may have a first portion 1002 extending from first surface 512 to inner boundary 514 and a second portion 1004 extending from inner boundary 514 to second surface 1006. In some cases, customized graphic set 510 comprises an arrangement of dyes that are associated with first portion 1002 of backer material 500. In particular, customized graphic set 510 may extend from first surface 512 through first portion 1002 and to inner boundary 514, and may not extend through second portion 1004 of backer material 500. With this arrangement, customized graphic set 510 may be visible on first surface 512 of backer material 500. In contrast, in some cases, customized graphic set 510 may not be visible on second surface 1006 of backer material 500, which may be associated with an interior of a glove in some cases.

In the current embodiment, customized graphic set 510 can be created using two different colored dyes, as illustrated in FIG. 10. However, it should be understood that in other embodiments, any number of dyes and/or colors can be used to create a set of customized graphics.

As illustrated in FIG. 10, protective layer 600 may be attached to first surface 512 of backer material 500. In different embodiments, protective layer 600 can have different thicknesses. In some cases, protective layer 600 can be thicker than backer material 500. In other cases, protective layer 600 can be thinner than backer material 500. In still other cases, protective layer 600 can have a substantially similar thickness to backer material 500. In this exemplary embodiment, protective layer 600 has a thickness T1 and backer material 500 has a thickness T2. In particular, thickness T1 is substantially larger than thickness T2.

Figure 11:
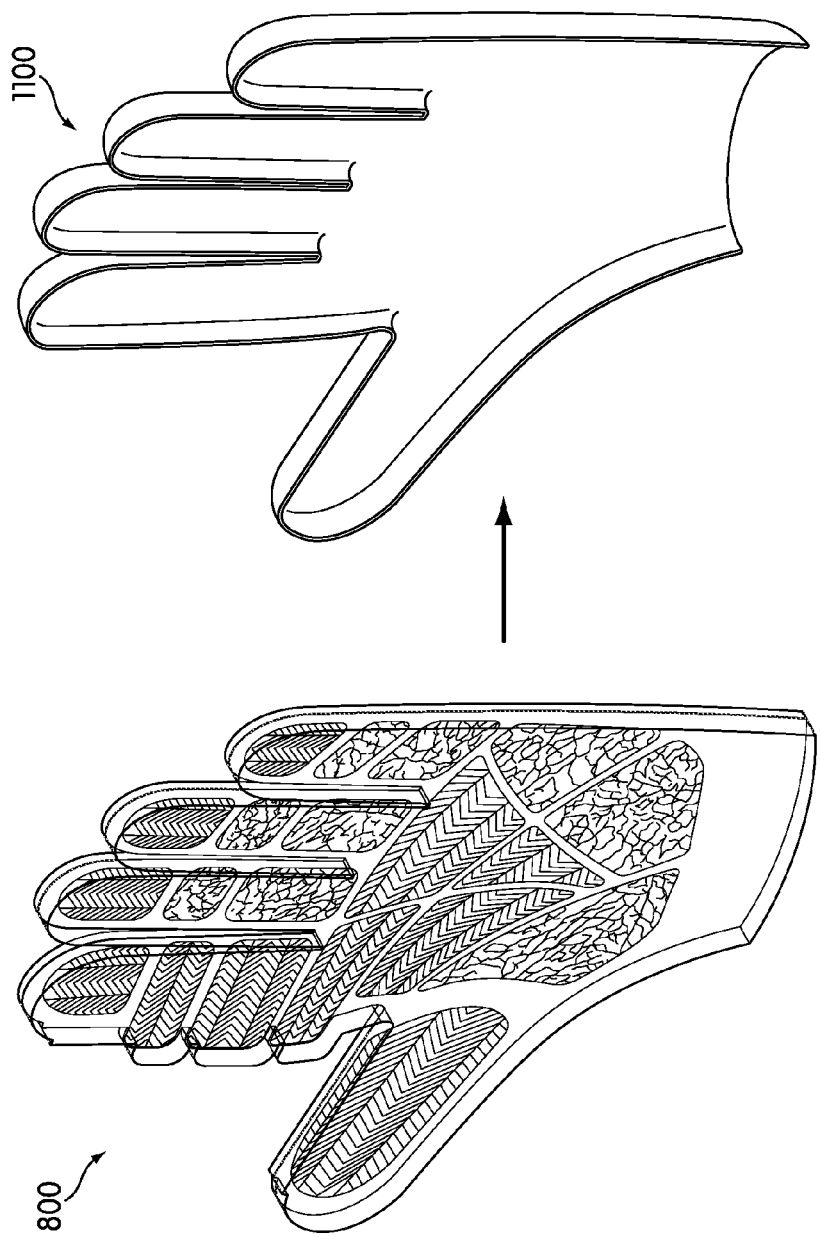
FIG. 11 is a schematic view of an exemplary embodiment of a palm portion of an article being associated with another portion of a glove.

After a graphic and a protective layer have been applied to a backer material, the backer material may be combined with one or more additional portions to form an assembled article. Referring to FIG. 11, palm portion 800 may be associated with glove portion 1100. In some cases, glove portion 1100 comprises a majority of the portions of a glove. In this case, palm portion 800 may be combined with glove portion 1100 to form a full assembled glove. In different embodiments, palm portion 800 can be combined with glove portion 1100 in any manner known in the art, including, but not limited to, sewing and/or gluing.

Figure 12:
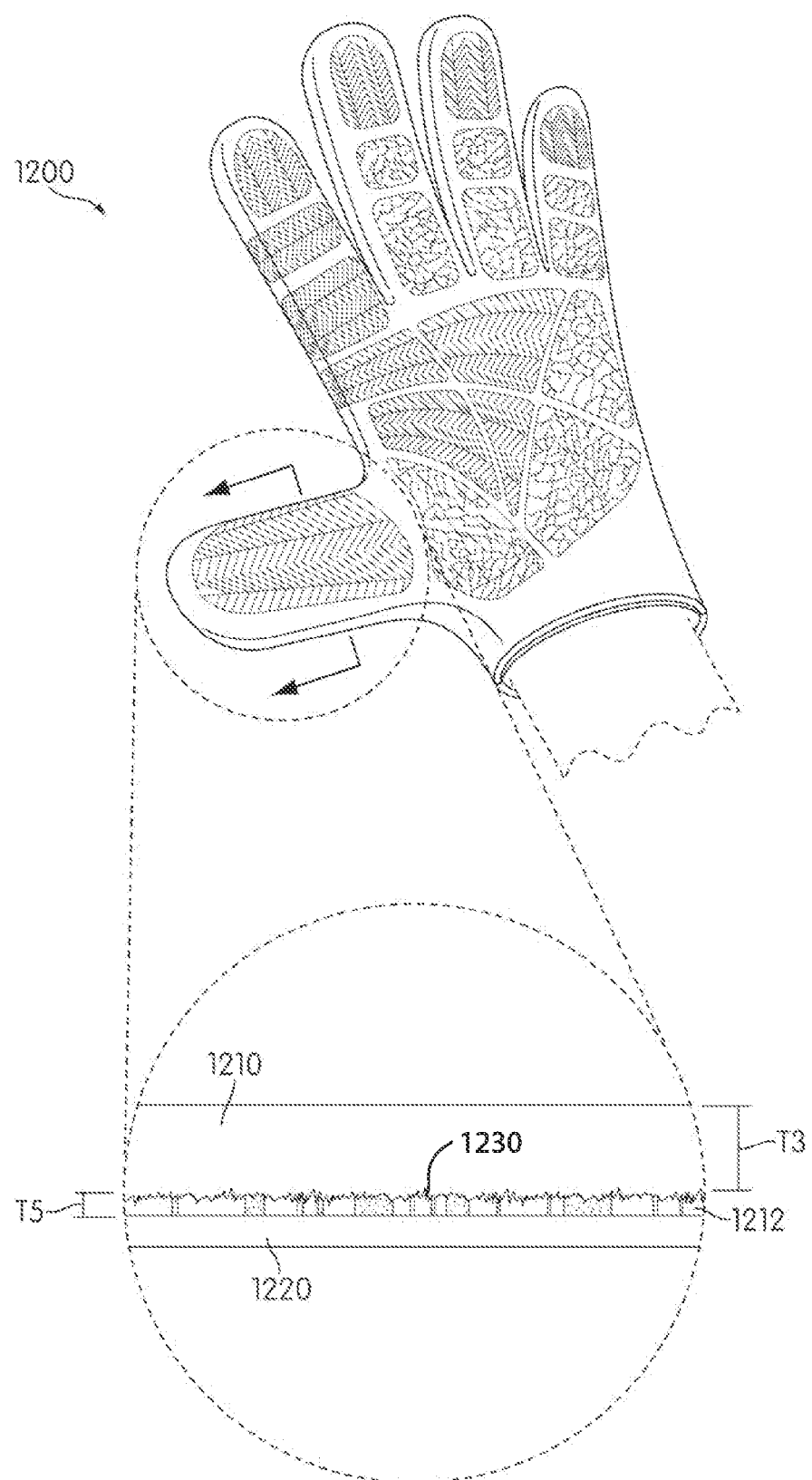
FIG. 12 is a schematic view of an exemplary embodiment of an article in a first condition.
Figure 13:
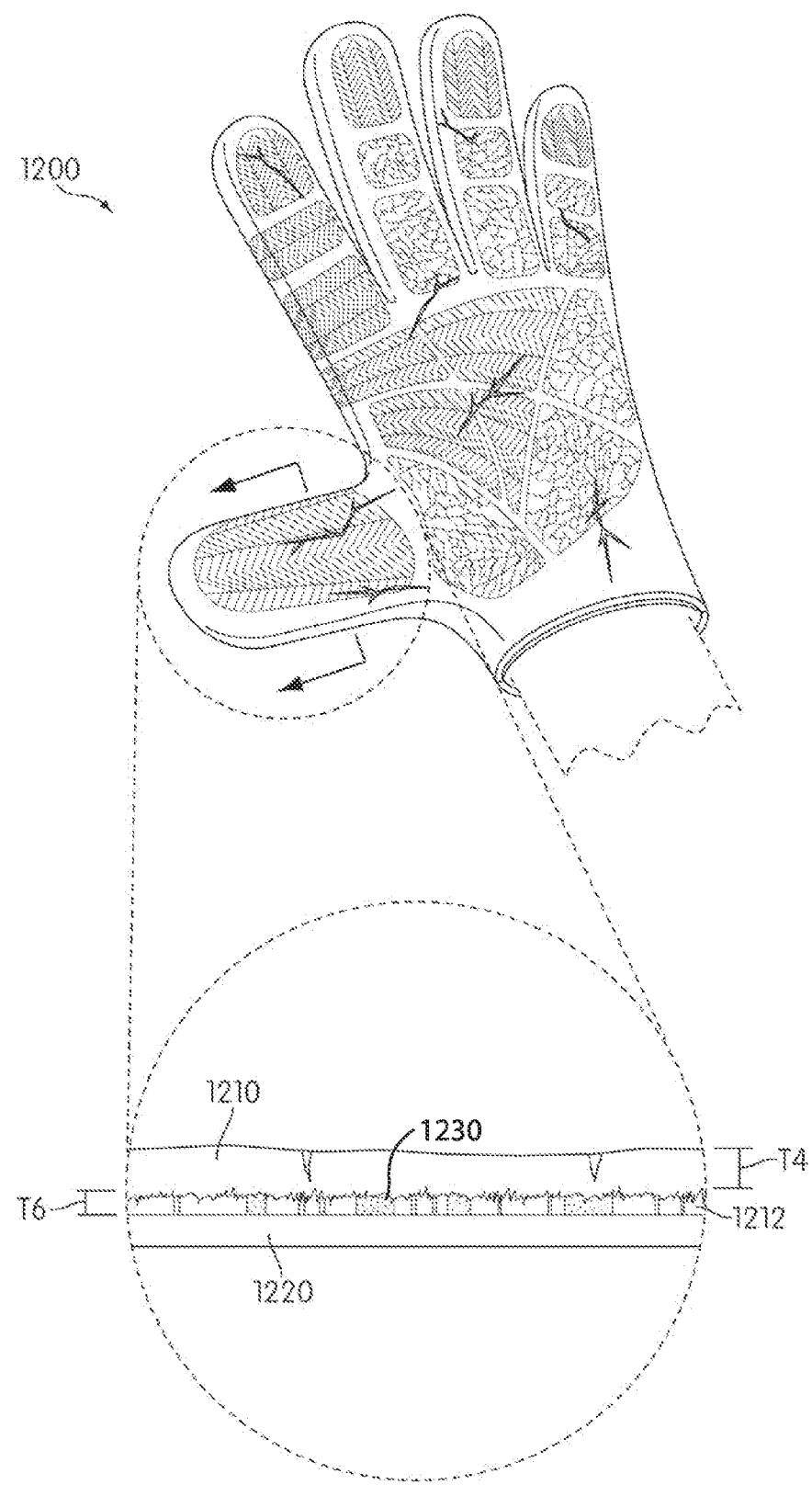
FIG. 13 is a schematic view of an exemplary embodiment of an article in a second condition.

In some embodiments, a protective layer can be configured to maintain the integrity of one or more graphics that have been applied to a backer material. FIGS. 12 and 13 illustrate an embodiment of two different conditions of glove 1200. In particular, a first condition of glove 1200 may be associated with a substantially new condition of a glove following a manufacturing process. Additionally, a second condition of glove 1200 may be associated with a used condition of glove 1200. In this used condition, glove 1200 may have scratches and/or other indicators of use.

In some embodiments, as glove 1200 transitions from first condition to a second condition, protective layer 1210 may be substantially worn down. In one embodiment, the first condition of glove 1200 may be associated with thickness T3 for protective layer 1210. Furthermore, the second condition of glove 1200 may be associated with thickness T4. In some embodiments, due to time and use, thickness T4 can be substantially less than thickness T3. In one exemplary embodiment, thickness T4 may be approximately fifty percent of the value of thickness T3.

Although protective layer 1210 may be substantially worn down, the integrity of customized graphics 1230 are maintained with time and use because of the protection provided by protective layer 1210. In some cases, customized graphics 1230 extend throughout first portion 1212 of backer material 1220. In other words, the dyes of customized graphics 1230 may extend throughout first portion 1212. In some cases, customized graphics 1230 may have a thickness T5 associated with the first condition of glove 1200. Following some time and use, customized graphics 510 have a thickness T6 associated with the second condition of glove 1200. In this exemplary embodiment, thickness T5 may be substantially equal to thickness T6. In other words, the extension of customized graphics 510 throughout first portion 1212 is maintained between the first condition and second condition. In contrast, in embodiments where a graphic is embedded in a coating disposed on a backer material, some portions of the graphic may be worn away with time and/or use. Similarly, in embodiments where a graphic is printed onto a backer material without the use of a protective layer, portions of the graphic may be worn away from the exposed portions of the backer material.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

What is claimed is:

1. A method of applying a graphic to an article of apparel, the method comprising:
    receiving the graphic associated with the article of apparel;
    applying the graphic directly on a backer material;
    covering the backer material and the graphic with a protective layer; and
    forming a portion of the article of apparel from the backer material, the graphic, and the protective layer, the entire portion of the article of apparel conforming to a portion of a wearer.

2. The method according to claim 1, wherein the step of applying the graphic further includes applying a set of customized graphics arranged as a palm of a glove directly on the backer material.

3. The method according to claim 1, wherein the step of applying the graphic further includes printing the graphic directly on the backer material using a dye sublimation printer.

4. The method according to claim 1, wherein the step of covering the backer material and the graphic further includes applying the protective layer to a surface of the backer material that is associated with an outer surface of the article of apparel.

5. The method according to claim 1, wherein the protective layer is a transparent silicone.

6. The method according to claim 1, wherein the graphic is received from a customization system.

7. The method according to claim 1, wherein the article of apparel is a glove, and the step of forming further includes (a) forming a first material element from the backer material, the graphic, and the protective layer, and (b) forming a glove from the first material element and one or more additional material elements.

8. The method according to claim 1, wherein the article of apparel is a glove, and the step of forming includes forming an entire palmar side of the glove from the backer material.

9. A method of applying a graphic to an article of apparel, the method comprising:
 receiving the graphic associated with the article of apparel;
 printing the graphic directly on the backer material using a dye sublimation printer;
 covering the backer material and the graphic with a transparent silicone layer; and
 forming a portion of the article of apparel from the backer material, the graphic, and the silicone layer, the portion of the article of apparel having (a) a first surface facing away from a wearer and an opposite second surface and (b) a first portion disposed on a first side and a second portion disposed on an opposite second side, and the graphic extending from the first surface through the first portion.

10. The method according to claim 9, wherein the backer material has a first thickness, the silicone layer has a second thickness, and the second thickness is greater than the first thickness.

11. The method according to claim 9, wherein the portion of the article of apparel includes a metacarpal region and a plurality of phalangeal regions.

12. The method according to claim 11, wherein the portion of the article of apparel is an entire palmar side of a glove.

13. A method of applying a graphic to a glove, the method comprising:
 receiving the graphic associated with the glove;
 printing the graphic directly on a backer material;
 covering the backer material and the graphic with a protective layer;
 forming a first material element from the backer material, the graphic, and the protective layer; and
 combining the first material element with one or more additional material elements to form the glove.

14. The method according to claim 13, wherein the graphic includes a plurality of pre-selected graphic regions, and each graphic region of the plurality of pre-selected graphic regions is disposed on one of a phalangeal region of the backer material and a metacarpal region of the backer material.

15. The method according to claim 13, wherein the step of printing the graphic further includes printing the graphic directly on the backer material using a dye sublimation printer.

16. The method according to claim 13, wherein the step of covering the backer material further includes applying the protective layer to a surface of the backer material that is associated with an outer surface of the glove.

17. The method according to claim 13, wherein the protective layer is a transparent silicone.

18. The method according to claim 13, wherein the graphic is received from a customization system.

19. The method according to claim 13, wherein the first material element forms an entire palmar side of the glove.

20. The method according to claim 13, wherein the backer material has a first thickness, the protective layer has a second thickness, and the second thickness is greater than the first thickness.

* * * * *